No. 658,665. Patented Sept. 25, 1900.
T. E. MAHONEY.
FEEDER FOR THRESHING MACHINES.
(Application filed May 22, 1899.)
(No Model.) 2 Sheets—Sheet 1.
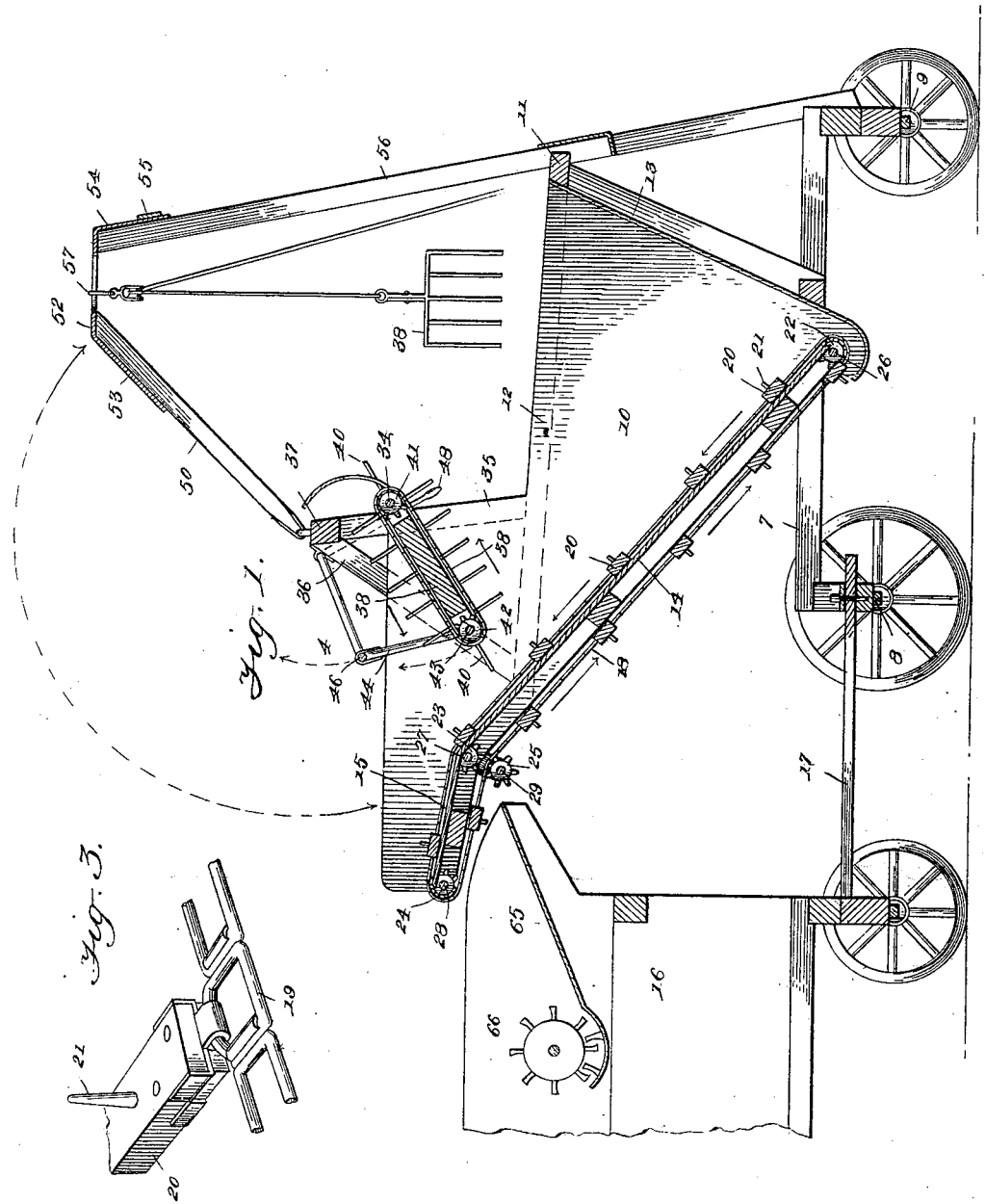
Witnesses
Inventor
T. E. Mahoney,
Attorneys No. 658,665. Patented Sept. 25, 1900.
T. E. MAHONEY.
FEEDER FOR THRESHING MACHINES.
(Application filed May 22, 1899.)
(No Model.) 2 Sheets—Sheet 2.
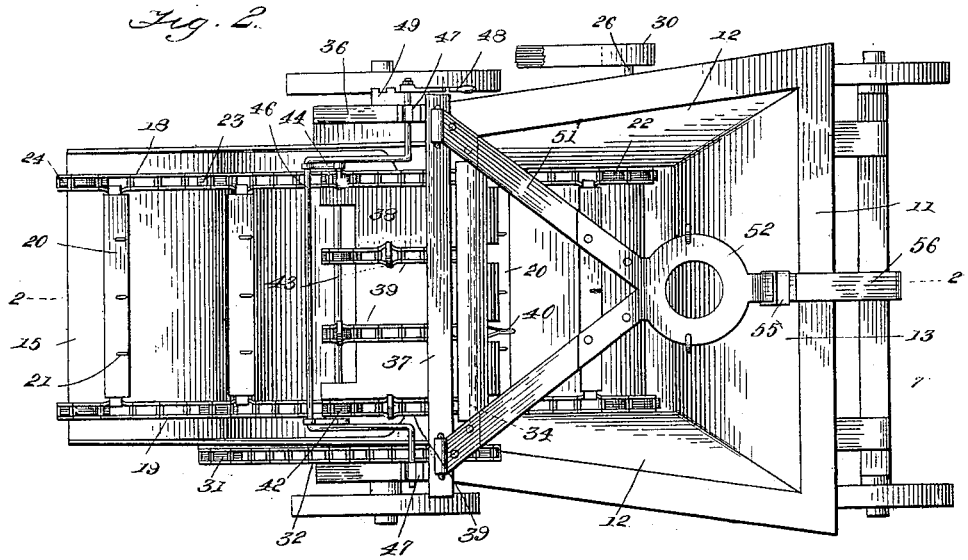
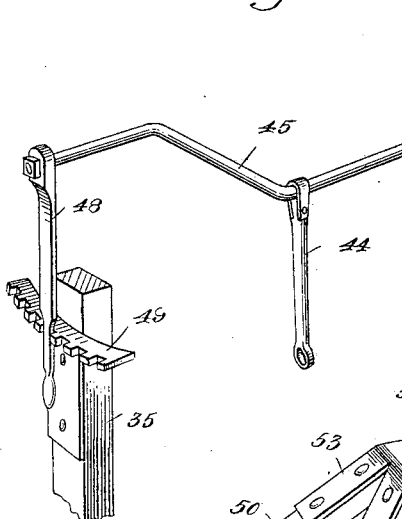
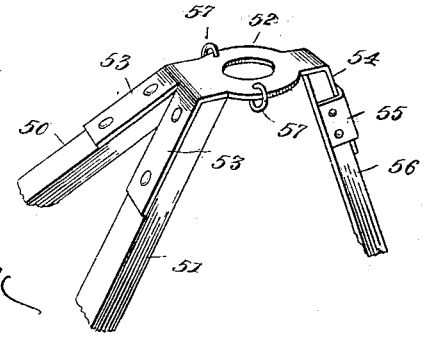
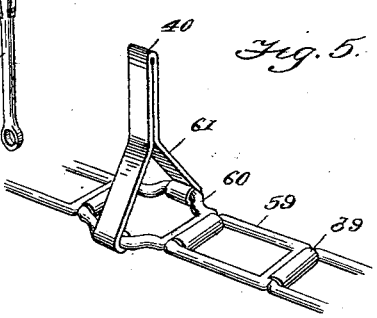
Witnesses
F. W. Riley,
Chas. E. Rwck
Inventor
T. E. Mahoney,
by O'Meara &c.
Attorneys
THE NORRIS PETERS CO., PHOTO-LITHO., WASHINGTON, D. C.

UNITED STATES PATENT OFFICE.

THOMAS E. MAHONEY, OF BUNKER HILL, KANSAS.

FEEDER FOR THRESHING-MACHINES.

SPECIFICATION forming part of Letters Patent No. 658,665, dated September 25, 1900.

Application filed May 22, 1899. Serial No. 717,794. (No model.)

*To all whom it may concern:*

Be it known that I, THOMAS E. MAHONEY, a citizen of the United States, residing at Bunker Hill, in the county of Russell and State of Kansas, have invented a new and useful Feeder for Threshing-Machines, of which the following is a specification.

My invention relates to machinery for feeding grain from the stack to threshing-machines, and more especially to certain machinery which I term a "derrick self-feeder," whereby grain is taken from the stack by a derrick hay-fork run by steam, horse, or other suitable power and delivered into a hopper, from which it is elevated and delivered into the thresher by a link belt or conveyer, the quantity delivered being regulated by a suitable governor.

The object of the invention is to provide improved machinery whereby the services of a large percentage of the men required to feed the grain with hand-forks may be dispensed with, thus economizing in labor and enabling threshing to be done many times when it would be impossible or greatly impeded on account of the scarcity of help.

With this object in view my invention consists in the improved construction, arrangement, and combination of parts hereinafter fully described, and afterward specifically pointed out in the appended claims.

In order to enable others skilled in the art to which my invention most nearly appertains to make and use the same, I will now proceed to describe its construction and operation, reference being had to the accompanying drawings, forming part hereof, in which—

Figure 1 is a vertical longitudinal sectional view of a feeder constructed in accordance with my invention on the plane indicated by the broken line 1 1 of Fig. 2, the feeder being shown coupled to a thresher. Fig. 2 is a top plan view of the feeder. Fig. 3 is a detail perspective view of part of the link belt or conveyer. Fig. 4 is a detail perspective view of part of the governor supporting and adjusting mechanism. Fig. 5 is a detail perspective view of part of the governor link belt. Fig. 6 is a detail perspective view of the upper part of the derrick or tripod.

Like numerals of reference mark the same parts wherever they occur in the several figures of the drawings.

Referring to the drawings by numerals, 7 indicates a truck-frame mounted on axles 8 and wheels 9, upon which frame a hopper 10 is built up, said hopper comprising a suitable top frame 11, side, front, and rear supports for the sides 12, rear 13, and front 14, the front being inclined to a point slightly above the top frame, and thence in a nearly-horizontal plane at 15, overhanging the feed end of a thresher 16 when the feeder is coupled thereto by a pole 17.

A conveyer-belt composed of chains 18 and 19, connected by cross-bars 20, having teeth 21, passes up inside of the front 14 15 and back under it, the chains engaging sprocket-wheels 22 23 24 25 in its passage, said wheels being secured on shafts 26, 27, 28, and 29, the first named, 26, being the driving-shaft and rotated from any suitable power by a belt 30 in the direction to cause the toothed cross-bars to travel up the inclined front. The shaft 27, driven by the chains 18 and 19, has a sprocket-wheel 31 at one end connected by a drive-chain 32 with a sprocket-wheel 33 on the end of a shaft 34, mounted in bearings secured to uprights 35, erected upon the top frame 11. The uprights 35 are braced by standards 36 and both are connected at their upper end by a cross-beam 37.

The shaft 34 serves as a pivot for a framework 38, around which pass a number of drive-chains 39, having projecting teeth 40, such chains engaging sprocket-wheels 41 on shaft 34 and sprocket-wheels 42 on a shaft 43, journaled in the outer end of frame 38. Links 44 suspend the shaft 43 (and the free end of frame 38) from a crank-bend 45 in a rod or shaft 46, journaled in brackets 47, secured to standards 36, said shaft having a lever 48 at one end adapted to engage the teeth of a curved rack 49, secured to standard 36, whereby the frame 38 may be adjusted on shaft 34 to any desired inclination and secured in such adjustment.

50 51 indicate two legs of a derrick or tripod, pivotally secured on cross-beam 37, at their outer ends, to a ring 52 by means of arms 53, another arm 54 of the ring being provided with an inclined socket 55 to receive the upper end of the third leg 56 of the derrick or tripod, which is removably secured to the truck and the top frame 11 of the hopper.

Links 57, secured to the ring 52, serve as points of suspension for a derrick hay-fork 58, of any suitable form, operated by any suitable power to take grain from the stack and drop it into the hopper.

The chains 39 are principally composed of ordinary links 59, with occasional links 60 of special construction, such links 60 having their side bars bent outward and formed with bearings for the ends of the two extended ends 61 of the teeth 40, said teeth and securing-arms being made of a single flat strip of metal, each forming an inverted Y, the stem being double and the arms single thickness and the teeth presenting their edges to the front, thus strengthening and stiffening them.

The conveyer-belt distended links, as at 62 in Fig. 3, around which engage loops 63, have arms 64, by means of which they are secured to the toothed cross-bars 20.

In the operation of the device grain is taken from the stack by the fork and deposited in the hopper, from whence it is taken up by the conveyer-belt and dropped upon the incline 65, leading to the cylinder 66 of any ordinary thresher. During its passage up on the conveyer-belt the grain is operated upon by the teeth 40 of chains 39, rotated in the opposite direction, and all superfluous grain thrown back, the amount allowed to pass into the thresher being governed by the position of the "governor," (by which term I denominate the structure composed of framework 38, chains 39, and teeth 40,) which, as before explained, can be adjusted to bring its free end to any suitable distance from the conveyer-belt and securely held in such adjustment.

From the foregoing it will be apparent that I provide means whereby the objects of my invention are carried out and the thresher supplied with grain at a very great saving of hand labor, trouble, and expense.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a feeder for threshers, the combination with a truck provided with a hopper, of conveyer-belts in the hopper, a cross-beam secured above the hopper, two legs pivotally secured to said beam, a plate secured to the upper ends of said legs, provided with a socket, and a third leg detachably secured to the truck and the hopper at one end and fitting removably within said socket at the other, substantially as described.

2. The governor-chain herein described comprising a chain of ordinary drive-chain links having links at intervals with distended sides, and teeth consisting of flat strips of metal doubled and formed into Y shape, the double stems forming teeth and the single thick arms secured on the distended links, substantially as described.

3. The combination with the truck and the hopper having top frame, and a cross-beam, of a pair of legs pivoted to the cross-beam and joined together at their outer ends, a metal ring having arms secured to said legs, third arm to said ring having a socket, and a third leg secured removably in said socket and to the hopper frame and truck, substantially as described.

THOS. E. MAHONEY.

Witnesses:
D. GROSS,
C. SHAFFER.